United States Patent [19]

Thomas

[11] 3,985,153

[45] Oct. 12, 1976

[54] PRESSURE COMPENSATING VALVE SPOOL ASSEMBLY FOR A HYDRAULIC CONTROL VALVE

[75] Inventor: Vitas T. Thomas, Racine, Wis.

[73] Assignee: Tomco, Inc., Racine, Wis.

[22] Filed: Aug. 28, 1974

[21] Appl. No.: 501,180

[52] U.S. Cl. .................................. 137/596; 91/446; 137/102; 137/596.12

[51] Int. Cl.[2] .......................................... F16K 11/00

[58] Field of Search .............. 91/446, 447; 137/596, 137/612.1, 596.12, 596.13, 102, 625.68

[56] References Cited

UNITED STATES PATENTS

| | | | |
|---|---|---|---|
| 2,678,638 | 5/1954 | Bopp | 91/447 |
| 2,946,347 | 7/1960 | Ruhl | 137/612.1 |
| 3,136,328 | 6/1964 | Hipp | 137/596.13 |
| 3,910,311 | 10/1975 | Wilke | 137/596 |

FOREIGN PATENTS OR APPLICATIONS

| | | | |
|---|---|---|---|
| 714,903 | 11/1952 | United Kingdom | 91/447 |

*Primary Examiner*—William R. Cline
*Assistant Examiner*—H. Jay Spiegel
*Attorney, Agent, or Firm*—Ronald E. Barry

[57] ABSTRACT

A pressure compensating valve spool for a hydraulic flow control valve, the valve spool being slidably positioned in the valve for movement from a neutral position wherein fluid will flow through the valve to operative positions in either direction to provide fluid communication from a fluid inlet passage to one of a pair of cylinder passages, the other of said cylinder passages being in fluid communication with a tank passage. The valve spool includes fluid pressure compensating members positioned within each end of the valve spool to vary the fluid flow rate to the cylinder passages, the fluid flow rate being varied to maintain a constant pressure differential between the pressure in the fluid inlet passage and the pressure of the fluid in the valve spool.

7 Claims, 2 Drawing Figures

PRESSURE COMPENSATING VALVE SPOOL ASSEMBLY FOR A HYDRAULIC CONTROL VALVE

BACKGROUND OF THE INVENTION

In a hydraulically controlled device such as a fork lift truck or a front end loader, a hydraulic piston and cylinder assembly is used to raise and lower the load. Particularly in a front end loader, the force required to raise the load will vary considerably depending on the type of work that is being done. For example, the initial force required to move the front end loader may be considerable and as soon as the loader clears, the amount of force required can drop suddenly. It is important at that instant to have a controlled fluid flow rate to eliminate any sudden or jerky motion of the load. Efforts to overcome this problem have been directed primarily to systems wherein the valve spool is moved in order to control the flow rate to the cylinder passage. This involves a complicated external pressure sensing arrangement that will respond to pressure changes and move the entire valve spool. As as example, in copending application Ser. No. 403,509, filed Oct. 4, 1973 entitled "Pressure Compensating Fluid Control Valve" of James O. Byers and assigned to the same assignee as the present application, a hydraulic valve is shown having pressure compensation by controlling the position of the valve spool.

SUMMARY OF THE INVENTION

The pressure compensating valve spool assembly of the present invention provides for a variable flow rate in direct relation to the pressure differential between inlet fluid pressure and the pressure of the fluid in the valve spool. The pressure compensating valve is located within the valve spool and responds instantly to pressure changes to maintain the pressure differential constant. The incorporation of the pressure compensating valve within the valve spool provides a compact arrangement without adding any structure to the hydraulic circuits of the system. The pressure compensating valve also acts automatically and does not require any movement in the valve spool in order to accomplish its function.

DRAWINGS

DESCRIPTION OF THE INVENTION

Figure 1:
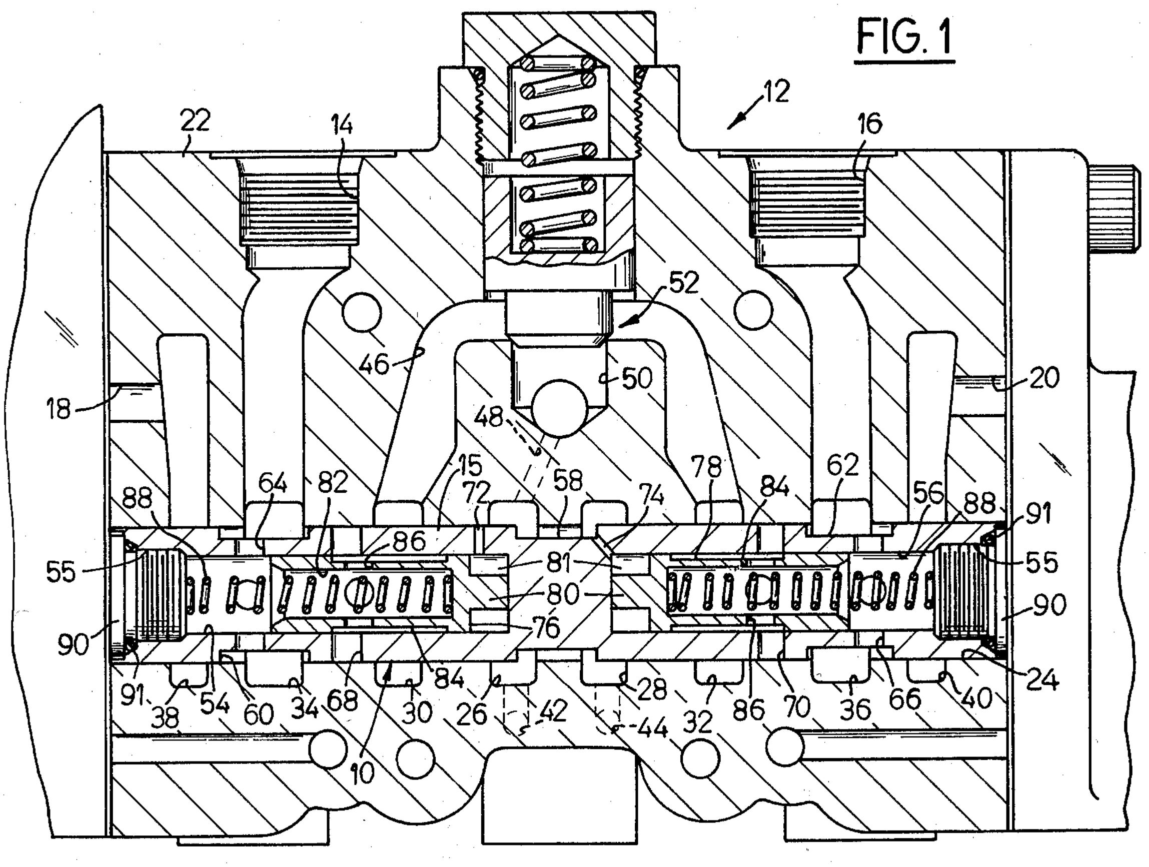
FIG. 1 is a sectional side view in elevation showing the position of a hydraulic control valve with the pressure compensating valve spool in a neutral position.

The pressure compensating valve spool assembly 10 according to the invention is used in a proportional pressure compensating hydraulic control valve 12 of the type shown in copending application Ser. No. 403,509. In this type of a valve, the valve spool assembly 10 is movable from a neutral position in either direction to operative positions. In the neutral position of the valve, fluid is allowed to flow through the valve directly to reservoir. In the operative position of the valve, fluid is directed to one or the other of a pair of cylinder passages 14 and 16 and the other of the cylinder passages 14 and 16 is connected to one of a pair of tank passages 18 or 20.

In accordance with the invention, the valve spool assembly 10 is used to provide pressure compensation of the fluid flow rate between valve inlet pressure and the pressure of the fluid in the cylinder passage 14 or 16. With this arrangement, a variable fluid flow rate is provided to the hydraulic unit being pressurized in relation to the pressure differential between inlet and cylinder pressure. A constant hydraulic lift force is thereby provided throughout the full motion of the hydraulic unit.

More particularly, the valve 12 includes a housing 22 having a cylindrical bore 24 extending through its full length. Four pairs of cored annular recesses or wells 26, 28; 30, 32; 34, 36; and 38, 40 are spaced at intervals axially in the bore 24. A fluid inlet passage 42 is connected to one of the first pair of annular recesses 26 and a discharge passage 44 is connected to the other of the first pair of annular recesses 28. Fluid under pressure is directed to the second pair of annular recesses 30 and 32 through a pressure passage 46 which is connected to the annular recess 26 as described hereinafter. The third pair of annular recesses 34 and 36 are connected to the cylinder passages 14 and 16, respectively. The fourth pair of annular recesses 38 and 40 are connected to reservoir or tank through the tank passages 18 and 20, respectively.

Fluid is admitted to the fluid pressure or control passage 46 through a port 48 connected to the first annular recess 26 and to a well 50 provided at the center of the passage 46. The inlet pressure of fluid from the first recess 26 to the passage 46 is controlled by means of a poppet valve 52 provided in the well 50 in a manner as set forth in the copending application Ser. No. 403,509.

The Valve Spool

The valve spool assembly 10 is used to provide a predetermined maximum flow rate through the cylinder passages 14 and 16. As seen in the drawings, the assembly 10 includes a cylindrical member or spool 15 having a blind bore 54 and 56 at each end. A threaded section 55 is provided at the inlet to each of the blind bores 54 and 56. An annular groove 58 is provided in the center of the spool 15 and is of sufficient width to provide fluid communication between recesses 26 and 28 in the neutral position of the spool 15 in the valve housing.

Fluid communication is provided between the cylinder passages 14 and 16 and the tank passages 18 and 20 by means of a pair of annular recesses or grooves 60 and 62 provided in the outer surface of the spool 15 at equally spaced intervals from the annular groove 58. Groove 60 is connected to the blind bore 54 by means of a number of ports 64. Groove 62 is connected to the blind bore 56 by means of a number of ports 66.

Fluid communication is provided between the pressure passage 46 and the blind bore 54 by means of a number of ports 68. Fluid communication is provided between the pressure passage 46 and the blind bore 56 by means of a number of ports 70.

Fluid under pressure is directed from the recess 26 to the inner end of the blind bore 54 through a restricted orifice 72. Fluid is directed from the recess 26 to the inner end of the blind bore 56 by means of a restricted orifice 74.

Pressure compensation of the fluid flow rate through the blind bores 54 and 56 is maintained by means of tubular valves or members 76 and 78, respectively.

Each of the valves 76 and 78 includes an extension 80 at the inner end and a blind bore 82 at the outer end. The extension 80 is used to provide a clearance 81 between the end of the blind bore and the valve members 76 and 78. Fluid communication between the ports 68 and 70 and the blind bores 82 is provided by means of an annular groove 84 and a number of ports 86 provided in the outer surface of each of the valve members 76 and 78.

Each of the valve members 76 and 78 is biased into engagement with the end of the respective blind bores 54 and 56 in spool 15 by means of a spring 88. The spring 88 is seated between the end of the blind bore 82 of the valve member and a plug 90 threadedly received in the threaded section 55 at the entrance to the bores 54 and 56. The plugs 90 are sealed in the ends of the bores 54 and 56 by means of O-ring seals 91.

Figure 2:
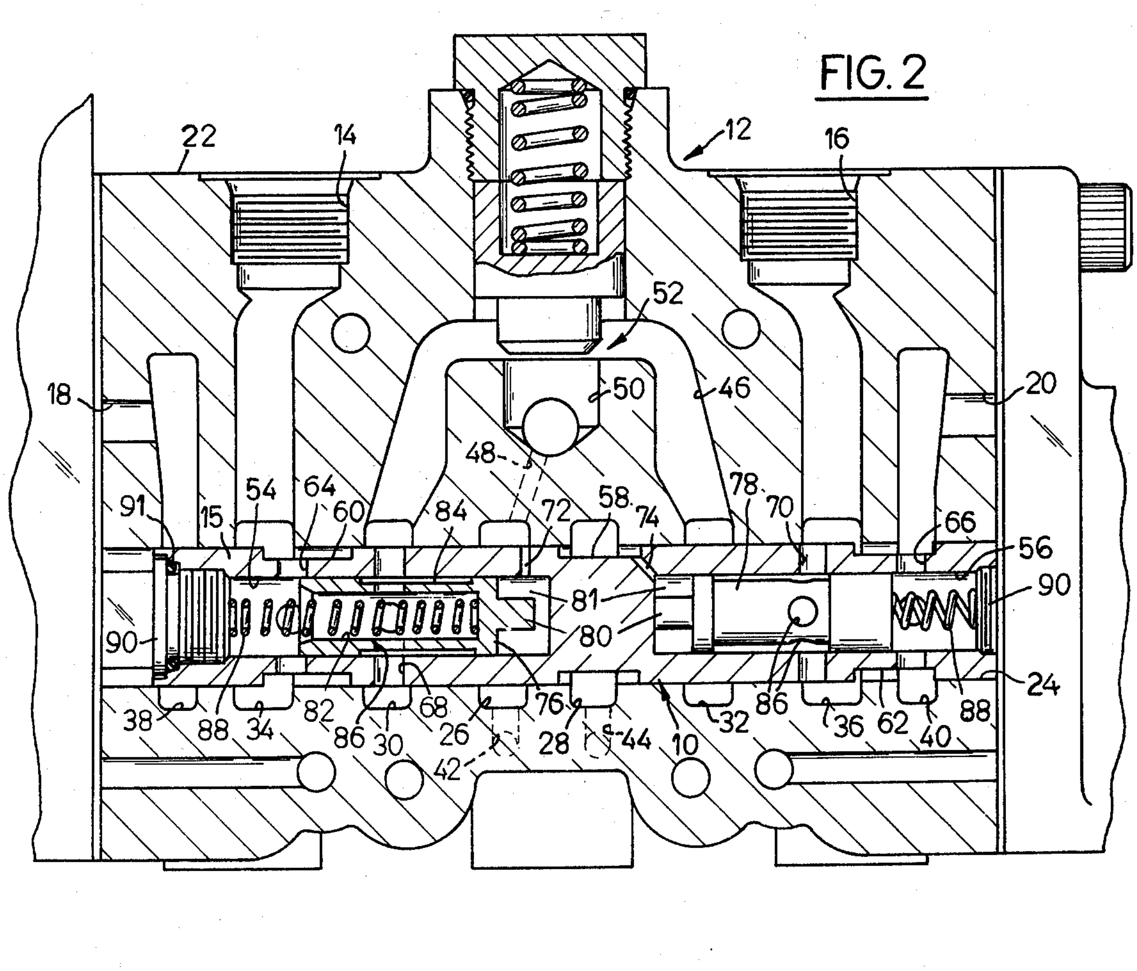
FIG. 2 is a view similar to FIG. 1 showing the valve spool in an operative position.

In operation, the valve spool assembly 10 in the neutral position will allow fluid to flow from the inlet passage 42 through the recess 26, annular groove 58 and recess 28 through passage 44 to tank. When the valve spool assembly 10 is moved to an operative position as shown in FIG. 2, the valve spool 15 will close the flow path between the recess 26 and 28 causing the fluid under pressure in recess 26 to flow through the passage 48 to the well 50 and through the valve 52 to the fluid passage 46. In the operative position, fluid under pressure in the passage 46 will flow through the port 68 into the blind bore 54 in the left end of the spool 10. The fluid under pressure entering the blind bore 54 will be directed through the recess 84 to the port 86 in valve member 76 and will flow through the bore 82 through the port 64 to the cylinder passage 14. Fluid returning through the cylinder passage 16 will flow through the annular recess 62 at the other end of the valve spool 10 and out to tank passage 20.

The flow rate of fluid from the pressure passage 46 to the cylinder passage 14 will be regulated by the position of the valve member 76 in the bore 54. In this regard, fluid under pressure in recess 26 will flow through the orifice 72 into the clearance 81 provided by extension 80 at the end of the blind bore 54. As the pressure builds up in the clearance 81 and blind bore 54, the valve member 76 will move to the left against the bias of spring 88 closing the ports 64. As pressure builds up within the blind bore 54, the force acting on the valve member, plus the force of the spring 88 will move member 76 to the right gradually opening the port 64. The fluid under pressure in the end of the bore 54 will be forced through the restricted orifice 72 into the recess 26. The fluid flow rate between the passage 46 and the port 64 is varied by maintaining a constant pressure differential between the fluid in the clearance 81 at the end of the bore 54 and the pressure of the fluid in the cylinder passage 14.

With regard to this last, it will be noted that the pressure of the fluid on each side of the valve member 76 will be acting on identical cross-sectional areas. When the force of the pressure of the fluid, plus the force of the spring 88, equals the force of the pressure of the fluid on the inlet side of the valve member, the valve member wil remain in a stable position. As the pressure builds up in the cylinder passage 14 with a corresponding build up of pressure within the bore 54, the valve member 76 will move to the right opening up the ports 64. The flow of fluid from passage 46 to the cylinder through the cylinder passage 14 will increase in order to maintain the same pressure differential between passage 42 and port 64.

In the event of a sudden drop of pressure in cylinder passage 14, a corresponding drop will occur in the bore 54. The force of the pressure of the fluid in clearance 81 will move the valve member 76 to the left modulating the flow of fluid through the ports 64 in order to maintain the pressure differential between passage 42 and port 64 and to prevent a sudden surge of fluid under pressure into the cylinder passage. Because of the small mass of the valve member 76 in relation to the valve spool 15, the response of the valve member 76 will be substantially instantaneous with any change in the fluid pressure in passage 14.

I claim:

1. A pressure compensating hydraulic flow control valve spool for a hydraulic valve including: a housing having a bore, a pair of fluid flow recesses in said bore, a fluid inlet passage connected to one of said recesses and a tank passage connected to the other of said recesses, a pair of cylinder passages connected to said bore, a pair of tank passages connected to said bore, and a fluid pressure passage connected to said fluid inlet passage and to said bore, said valve spool comprising a cylindrical spool slidably positioned in said bore for movement in opposite directions from a neutral position to operative positions in said bore, said spool in the neutral position providing fluid communication between said fluid flow recesses, the flow of fluid between said fluid flow recesses being constrained on movement of said valve spool from the neutral position to direct fluid from the fluid inlet passage to flow through said fluid pressure passage, said spool on movement from said neutral position including means for providing fluid communication from said pressure passage to one of said cylinder passages and from the other of said cylinder passages to one of said tank passages, and fluid pressure compensating valve means in each end of said valve spool for controlling the fluid flow rate between said fluid pressure passage and said cylinder passage, said valve means being connected to respond to the pressure differential between said cylinder passage and said inlet passage whereby the fluid flow rate across the valve means is controlled by maintaining a predetermined pressure differential between the pressure in the cylinder passage and the pressure in said fluid inlet passage.

2. The valve spool according to claim 1 wherein said spool includes a blind bore at each end, a first pair of ports in said valve spool for connecting one of said fluid flow recesses to said blind bores, a second pair of ports in said spool for connecting said fluid pressure passage to the corresponding blind bore, a first pair of annular recesses in said valve spool for providing fluid communication between said cylinder passage and said tank passage, and a third pair of ports in said valve spool for connecting said blind bores to the corresponding pair of said recesses, said compensating means comprising a hollow cylindrical member in each of said blind bores, said members each including means for providing fluid communication between said second ports and said third ports, spring means for biasing said member to an inoperative position for allowing unrestricted flow of fluid from said second port to said third port, and said member responding to the flow of fluid through said first port to restrict the flow of fluid through said third port.

3. The valve according to claim 1 wherein said valve spool includes a blind bore at each end, one of said tubular members being located in each of said blind bores, means for biasing each of said tubular members to an inoperative position within said blind bores, passage means in said valve spool connecting said blind bore to the inlet passage so that said tubular members move in response to an increase in inlet pressure to restrict fluid flow to said cylinder passage, passage means in said valve spool connecting said blind bores to said cylinder passage so that an increase in pressure within said cylinder passage moves said member to open the flow path to the cylinder passage.

4. In a control valve of the type having a body with a valve spool shiftable from a neutral position at which fluid from a fluid inlet passage flows through the valve to an operating position at which fluid is directed from the fluid inlet passage to a pressure passage, said pressure passage in the operative position of said valve spool being connected to one of a pair of cylinder passages, the other of said pair of cylinder passages being connected to a tank passage, the valve spool being characterized by a pressure compensating fluid flow rate control means within said valve spool comprising: a pair of tubular members within said valve spool for controlling the flow rate between the pressure passage and the cylinder passages, one of said members being in fluid communication with said fluid inlet passage and one of said cylinder passages when the valve spool is moved in one direction to an operating position and the other of said members being in fluid communication with said fluid inlet passage and the other of said cylinder passages when the valve spool is moved in the other direction to an operating position whereby said members respond to variations in pressure to maintain a predetermined pressure differential between said inlet passage and said cylinder passage and thereby control the fluid flow rate from the pressure passage to the cylinder passage.

5. In a hydraulically actuated lifting device including a hydraulic cylinder for operating the lifting element of said device, a hydraulic system for actuating said cylinder to move said lifting element, said system including a pressure compensating hydraulic flow control valve comprising: a housing having a bore, a valve spool within said bore for controlling the flow of hydraulic fluid through said housing, and an inner tubular member disposed within said valve spool for regulating the fluid flow rate through the valve spool, means for biasing said tubular member to an inoperative position, means in said valve spool for admitting inlet pressure fluid into said valve spool to move said tubular member against said biasing means to a position in which fluid flow to the cylinder passage is restricted, and means in said valve spool for admitting hydraulic fluid at cylinder pressure into said valve spool to move said inner tubular member against the force of the inlet pressure fluid to open the fluid flow path to the cylinder passage.

6. A pressure compensating hydraulic flow control valve spool assembly for a hydraulic valve including: a housing having a bore, a fluid flow passage connected to said bore, a cylinder passage connected to said bore, and a fluid pressure passage connected to said bore, said valve spool assembly comprising a spool slidably positioned in said bore for movement from a neutral position to an operative position, said spool in the neutral position providing a fluid flow path through the valve for said fluid flow passage, the spool in the operative position blocking fluid flow through said fluid flow passage and directing fluid to said fluid pressure passage, said spool including means for providing fluid communication between said pressure passage and said cylinder passage, a fluid pressure compensating means in said spool for varying the fluid flow rate to said cylinder passage, said compensating means being connected to said fluid flow passage and said cylinder passage whereby the pressure differential between the pressure of the fluid in said fluid flow passage and the pressure of fluid in said cylinder passage is maintained constant.

7. The valve spool according to claim 6 wherein said pressure compensating means includes a tubular member slidably positioned in said spool, a spring biasing said tubular member to an inoperative position within said spool, passage means in said spool connecting said fluid flow passage to one end of said member so that said member moves in response to an increase in pressure, and passage means in said spool connecting the other end of said member to said cylinder passage whereby said member responds to the pressure differential between each end of said member.

* * * * *